OR  3,791,714

United States

SEARCH ROOM

Maurer

[11] 3,791,714
[45] Feb. 12, 1974

[54] METHOD OF PRODUCING GLASS FOR OPTICAL WAVEGUIDES

[75] Inventor: Robert Distler Maurer, Painted Post, N.Y.

[73] Assignee: Corning Glass Works, Corning, N.Y.

[22] Filed: Mar. 30, 1972

[21] Appl. No.: 239,589

[52] U.S. Cl. .................... 350/96 WG, 65/3, 65/30, 65/32, 65/134
[51] Int. Cl. ...... G02b 5/14, C03c 25/2, C03c 15/00
[58] Field of Search . 65/32, 30, 3, 134; 350/96 WG

[56] References Cited
UNITED STATES PATENTS

| 3,540,871 | 11/1970 | Dyer | 65/3 X |
| 3,490,961 | 1/1970 | Frieser et al. | 65/32 X |
| 3,619,440 | 11/1971 | Gray | 65/32 X |
| 2,967,113 | 1/1961 | Liebhafsky et al. | 65/32 X |

*Primary Examiner*—Frank W. Miga
*Attorney, Agent, or Firm*—Walter S. Zebrowski

[57] ABSTRACT

Deuterium is used instead of hydrogen in a process for producing glass having low hydroxyl ion content. In a flame hydrolysis process deuterium gas, or a deuterium compound gas, is passed through a liquid containing a silicon compound such as silicon tetrachloride. The resulting vapor is burned to deposit a film of silicon dioxide on a rotating mandrel. Glass produced in this manner is particularly suitable for use as optical waveguides. The hydroxyl ion normally present in glass produced in the presence of hydrogen is replaced by the deuterium containing ion $OD^-$. Absorption peaks normally caused by the presence of the hydroxyl ions are shifted to longer wavelengths at which the absorptions are not troublesome when the waveguide is used to transmit light in the band of approximately 7,000A.

12 Claims, 2 Drawing Figures

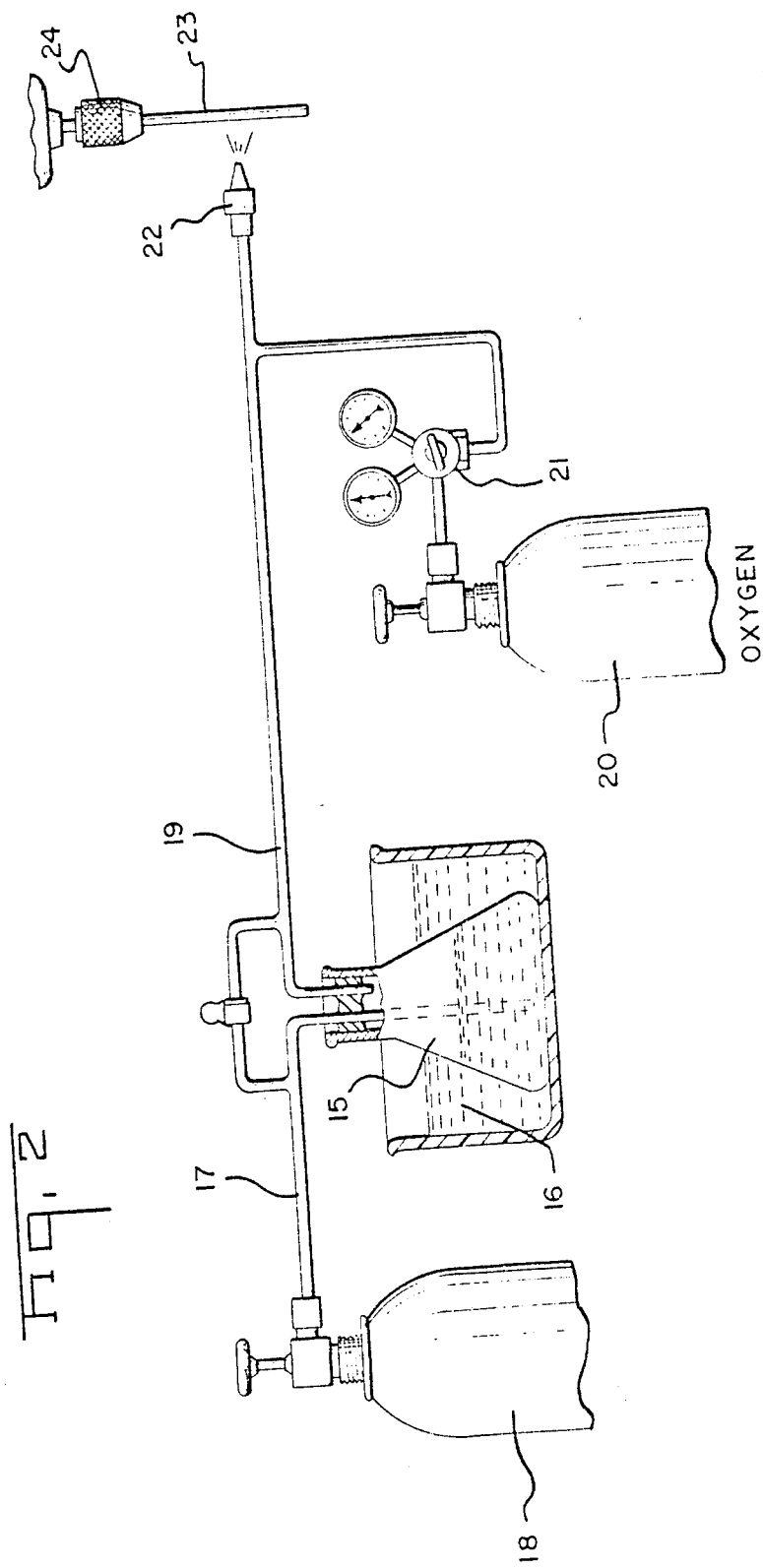

METHOD OF PRODUCING GLASS FOR OPTICAL WAVEGUIDES

BACKGROUND OF THE INVENTION

This invention relates to methods of producing glass for optical waveguides and more particularly to producing glass having low hydroxyl ion content by using deuterium in place of hydrogen in the glass-making process.

The requirement for high capacity communication systems has led to the use of optical waveguides. The theory of optical waveguides used in communication systems of this type is described in U.S. Pat. No. 3,157,726, Hicks et al., and in the publication "Cylindrical Dielectric Waveguide Mode", by E. Snitzer, *Journal of the Optical Society of America*, Volume 51, No. 5, pages 491–498, May 1961.

Recently, optical waveguides made of doped fused silica, or quartz, have been developed. These waveguides have very much lower attenuation than those previously available. These improved optical waveguides are described in the copending application of Maurer and Schultz, Ser. No. 36,109, entitled Glass Optical Waveguide. As an example of the improved attenuation characteristics, optical waveguides of the type described in the aforementioned application have an attenuation of approximately 10 db. per kilometer whereas most previously available optical waveguides have attenuation in the order of 1,000 db. per kilometer. Because of this improved attenuation, optical signals can be transmitted over long distances without repeaters, that is, i.e., without amplification.

Methods of producing optical waveguides suitable for transmission over long distances are described in copending application Ser. No. 36,267, filed May 11, 1970, Method of Producing Optical Waveguide Fibers, Keck and Schultz now U.S. Pat. No. 3,711,262, and assigned to a common assignee. A number of techniques have been used for making the glass used in these waveguides. The flame hydrolysis process described in U.S. Pat. No. 2,326,059 is one example.

Conventional glass used in optical waveguides exhibits optical absorption peaks at certain wavelengths. This causes attenuation if the waveguide is used to transmit light of the wavelengths at which the absorption peaks occur. The probability of certain of these absorption peaks is quite low. However, when waveguides of the type described above are used to transmit light over long distances, the absorption peaks become troublesome. While the probability of absorption per unit length is low, the long length of the waveguide will cause troublesome absorption.

The undesirable presence of water in glass has previously been recognized. U.S. Pat. No. 3,531,271 Dumbaugh, Jr. purposes preparing glass in a dry atmosphere to minimize the water.

SUMMARY OF THE INVENTION

In accordance with this invention, deuterium, or deuterium compounds, are used in place of hydrogen in making glass for optical waveguides.

In one embodiment, a flame hydrolysis process is used. In such a process a gas is transported through a liquid containing at least a silicon compound. The gas is burned to deposit a film of silicon dioxide or doped silicon dioxide which is gradually built up into a preform. In accordance with this invention, deuterium gas is passed through the liquid containing the silicon compound to form a gas-vapor mixture which, when burned, produces silicon dioxide or doped silicon dioxide with a low hydroxyl ion content.

In another embodiment, glass is produced by other processes in a deuterium gas atmosphere. In one of such other glass-making processes, a glass forming mixture of materials is heated in the presence of deuterium to form a glass in which the deuterium containing ion OD⁻ is produced in the glass instead of the hydroxyl ion OH⁻. In accordance with an important aspect of this invention, I have found that this shifts the troublesome absorption peaks to a higher wavelength band so that the absorption peaks do not interfere with transmission of optical information in the 7,000A region.

The foregoing and other objects, features and advantages of the invention will be understood from the following more detailed description, drawings and appended claims.

DESCRIPTION OF THE DRAWINGS

FIG. 2 shows one process for carrying out the invention.

DESCRIPTION OF A PARTICULAR EMBODIMENT

Figure 1:
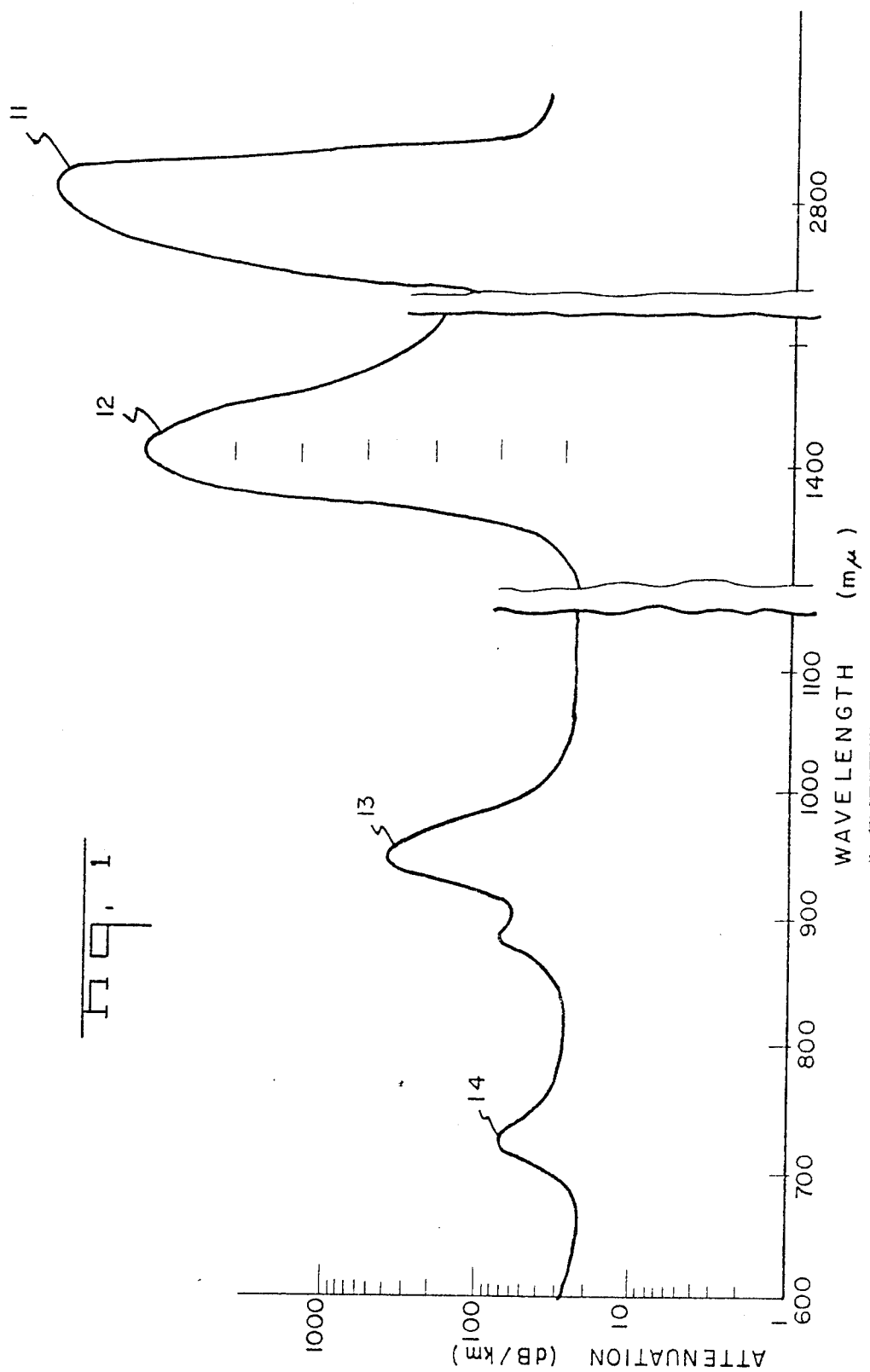
FIG. 1 shows absorption peaks at certain wavelengths.

FIG. 1 depicts the commonly observed absorption peaks in glass. At a wavelength of 2,800 mµ (28,000A) the peak 11 is caused by a single quantum absorption of light. As is known, this light absorption causes vibrations of the molecules. The phenomena has been particularly observed as light absorption by water molecules. Water is not actually present in glass but the hydroxyl ion OH⁻ attached onto a silicon molecule is present. This hydroxyl ion presents the same absorption phenomena as water and it has become common to refer to the presence of water in glass as causing absorption phenomena. For waveguides the fundamental absorption depicted by the peak 11 does not present problems because it occurs in the infrared spectrum well above the transmission band for optical waveguides.

The second harmonic transition depicted by the peak 12 occurs at approximately 1,400 mµ. This absorption peak also presents no great difficulty because it is still well above the normal transmission band for optical waveguides. The peaks 11 and 12 caused by the fundamental and second harmonic transitions have been very commonly observed.

Third harmonic and fourth harmonic transitions cause the absorption peaks at 13 and 14. (The amplitudes of peaks 13 and 14 are approximately to scale with the abscissa which is attenuation in db. per kilometer. However, the peaks 11 and 12 are not necessarily to scale but have been drawn merely to depict the phenomena which occur at these wavelengths of 1,400 and 2,800 mµ.)

The third and fourth harmonic transitions depicted by the peaks 13 and 14 are very improbable events. They have been observed only rarely previously. However, with the long transmission length optical fibers now in use, the absorption peaks 13 and 14 present a real problem. In particular, the absorption peak 14 at approximately 720 mµ presents a problem because the wave band around 700 mµ is a particularly good band for optical waveguide transmission. In accordance with my invention, the troublesome absorption peak around 720 mµ is obviated so that this band can be better used for waveguide transmission.

The process of making glass for optical waveguides in accordance with my invention is depicted in FIG. 2. A vapor generator includes a flask 15 containing a liquid suspension of silicon tetrachloride. As described in the aforementioned Nordberg patent, the liquid also contains titanium tetrachloride which is the dopant. While the invention is particularly applicable to glass-making processes in which silicon compounds are transformed into silicon dioxide glass, the method is applicable to any process in which a glass-forming compound is transformed to an oxide glass.

The flask 15 is supported in a constant temperature bath 16 and is provided with a tube 17 for introducing deuterium gas. Deuterium gas from the container 18 passes through the liquid suspension and produces a vapor containing silicon tetrachloride and titanium tetrachloride in the delivery tube 19.

An oxygen supply tank 20 is connected through a reducing valve 21 to the delivery tube 19. The delivery tube 19 is connected to a burner tip 22. A tapered mandrel 23 is held by a rotatable chuck 24. As the mandrel 23 rotates, the burning vapor from the burner 22 deposits a thin film of doped silicon dioxide on the mandrel. The film is uniformly deposited until it builds up a preform. This preform is then used to draw a waveguide as is more fully explained in the copending Schultz and Keck patent referred to previously.

The foregoing is one exemplary embodiment of a glass-making process in which deuterium is substituted for hydrogen. Many modifications will be apparent. For example, it will be understood that deuterated methane can be used in place of deuterium gas as the transporting gas.

It is known that the vibrational frequency (and hence the wavelength of absorption) varies as the square root of the mass of the vibrating atom. Hence, if $OH^-$ is replaced by $OD^-$ in glass, these absorptions will shift to longer wavelengths and become less troublesome. For example, the 720 mµ band shifts to $720 \times \sqrt{2} = 1,020$ mµ. The 700 mµ region is thus freed from troublesome absorption.

As an alternative to the flame hydrolysis process described above, other processes are also known. In one of such other processes a glass forming mixture of materials such as sodium metasilicate and silica is heated until a glass is produced. In accordance with the present invention, the mixture is heated in the presence of deuterium which results in the production of deuterium containing ions in the glass instead of the hydroxyl ions which would otherwise be present.

In another alternative the deuterium gas is passed through a bath containing a glass forming compound. The resulting vapor is mixed with a vapor containing a dopant compound. For example $AlCl_4$ may be heated in a container to produce a vapor which is mixed with the vapor containing the glass forming compound. The mixed vapors are then burned in a flame hydrolysis process.

While particular embodiments of the invention have been described, other modifications are within the true spirit and scope of this invention. The appended claims are intended to cover such modifications.

What is claimed is:

1. The method of producing glass optical waveguides having low hydroxyl ion content comprising:
   heating a glass-forming material in the presence of deuterium to produce an oxide glass having low hydroxyl ion content, and
   forming said oxide glass into an optical waveguide.

2. The method recited in claim 1 wherein said heating is one step in a flame hydrolysis process including the steps of:
   passing a gas containing deuterium through a liquid glass forming compound to produce a gaseous mixture containing vapors of said glass forming compound, and
   burning said mixture to deposit a film of said oxide glass.

3. The method recited in claim 2 further comprising:
   adding to said gaseous mixture a vapor containing a dopant compound prior to burning.

4. An optical waveguide formed of the low hydroxyl ion content glass of claim 1.

5. The method of producing glass optical waveguides having low hydroxyl ion content comprising:
   providing a liquid glass forming compound,
   passing a deuterium containing gas through said liquid compound to produce a mixture containing vapors of said glass forming compound,
   burning said mixture to deposit a film of glass, and
   drawing said film of glass into an optical waveguide.

6. The method recited in claim 5 wherein said glass forming compound is silicon tetrachloride.

7. The method recited in claim 6 wherein said liquid glass forming compound further contains titanium tetrachloride.

8. The method recited in claim 5 wherein the step of burning is performed in the presence of a preform to deposit a film of glass on said preform.

9. The method recited in claim 5 wherein the glass forming compound is a silicon compound and wherein the step of burning is performed in the presence of a rotating mandrel to deposit a preform containing silicon dioxide on said mandrel.

10. The method recited in claim 5 wherein said gas is deuterium gas.

11. The method recited in claim 5 wherein said gas is a deuterium compound.

12. The method recited in claim 5 wherein said gas is deuterated methane.

* * * * *